(12) United States Patent
Kogge et al.

(10) Patent No.: US 9,038,418 B2
(45) Date of Patent: May 26, 2015

(54) APPARATUSES FOR MANUFACTURING GLASS AND METHODS OF MANAGING PULLING FORCES APPLIED TO GLASS RIBBON

(71) Applicants: Chris Scott Kogge, Danville, KY (US); Gautam Narendra Kudva, Horseheads, NY (US); Michael Yoshiya Nishimoto, Shizuoka (JP)

(72) Inventors: Chris Scott Kogge, Danville, KY (US); Gautam Narendra Kudva, Horseheads, NY (US); Michael Yoshiya Nishimoto, Shizuoka (JP)

(73) Assignee: Corning Incorporated, Corning, NY (US)

( * ) Notice: Subject to any disclaimer, the term of this patent is extended or adjusted under 35 U.S.C. 154(b) by 274 days.

(21) Appl. No.: 13/626,337

(22) Filed: Sep. 25, 2012

(65) Prior Publication Data

US 2014/0083138 A1  Mar. 27, 2014

(51) Int. Cl.
*C03B 17/06* (2006.01)
*C03B 17/04* (2006.01)
*C03B 33/02* (2006.01)
*C03B 33/037* (2006.01)

(52) U.S. Cl.
CPC ............ *C03B 17/068* (2013.01); *C03B 17/064* (2013.01); *C03B 33/0215* (2013.01); *C03B 33/037* (2013.01)

(58) Field of Classification Search
CPC .. C03B 33/0215; C03B 17/068; C03B 17/06; C03B 17/064; C03B 21/00
USPC ...................................... 65/90–101
See application file for complete search history.

(56) References Cited

U.S. PATENT DOCUMENTS

| | | | |
|---|---|---|---|
| 5,934,538 A | 8/1999 | Hirose et al. | 226/194 |
| 7,430,880 B2 | 10/2008 | Butts et al. | 65/253 |
| 8,794,036 B2 * | 8/2014 | Markham et al. | 65/97 |
| 2005/0268655 A1 * | 12/2005 | Butts et al. | 65/29.12 |
| 2008/0184741 A1 | 8/2008 | Mueller et al. | 65/29.14 |
| 2009/0107182 A1 * | 4/2009 | Anderson et al. | 65/90 |
| 2010/0031702 A1 | 2/2010 | Tomamoto et al. | 65/91 |
| 2010/0126226 A1 | 5/2010 | Zhou et al. | 65/158 |
| 2011/0236631 A1 * | 9/2011 | Bisson et al. | 428/141 |
| 2011/0277507 A1 * | 11/2011 | Lu et al. | 65/97 |
| 2012/0103018 A1 * | 5/2012 | Lu et al. | 65/29.12 |
| 2012/0144864 A1 | 6/2012 | Tsuda et al. | 65/53 |
| 2012/0304695 A1 * | 12/2012 | Lakota et al. | 65/29.19 |

FOREIGN PATENT DOCUMENTS

WO  2010-141832 A1  12/2010

* cited by examiner

*Primary Examiner* — Jodi C Franklin
(74) *Attorney, Agent, or Firm* — Kevin M. Able (57) ABSTRACT

Methods and apparatuses for managing pulling forces applied to a glass ribbon in a draw apparatus are disclosed. The method includes applying a front-side and a rear-side drive torque to a glass. The method further includes calculating automatically with the at least one electronic controller a front-side and a rear-side average pulling force applied to the glass ribbon and corresponding to a first time period of at least one rotation of the front-side or rear-side stub roller, respectively. The front-side average pulling force and the rear-side average pulling force are compared to establish a pulling force differential between the front-side average pulling force and the rear-side average pulling force. One or more of the front-side drive torque or the rear-side drive torque are modified to decrease the pulling force differential between the front-side average pulling force and the rear-side average pulling force.

12 Claims, 3 Drawing Sheets

APPARATUSES FOR MANUFACTURING GLASS AND METHODS OF MANAGING PULLING FORCES APPLIED TO GLASS RIBBON

TECHNICAL FIELD

The present disclosure relates to methods and apparatuses for manufacturing glass and, in particular, to glass manufacturing apparatuses and methods for compensating for roller wear.

BACKGROUND

Draw processes are used in glass manufacturing operations to produce thin glass sheets that are used in a variety of products including flat panel displays. Glass sheets produced according to these processes typically exhibit enhanced flatness and smoothness compared to glass produced by different methods, such as the float method.

In order to produce glass ribbon in a draw process, pulling forces are applied to the glass ribbon while the glass is in a visco-elastic state, prior to the glass transitioning to an elastic state. The glass ribbon is drawn by stub rollers which apply the pulling forces to stretch the glass ribbon in a down-draw direction (i.e., in the direction of glass travel) and in a cross-draw direction normal to the down-draw direction. The pulling forces process the glass to the desired thickness for use in goods.

The physical interface of the stub roller with the glass ribbon affects the stability of the glass ribbon during the draw process, and affects the attributes of finished glass articles produced from the glass ribbon. However, the stub rollers are prone to wear due to contact with the glass ribbon, which may affect the physical interface between the stub roller and the glass ribbon, thereby degrading the quality of the final glass.

Accordingly, alternative draw apparatuses capable of managing roller wear and methods of managing roller wear of draw apparatuses are needed.

SUMMARY

The embodiments described herein relate to methods and apparatuses for applying pulling forces to glass ribbon during a draw process. The methods and apparatuses manage wear of the rollers, which may improve product yield from the manufacturing process, as well as balance the pulling forces applied to the glass ribbon during the draw process to improve mechanical attributes of the glass ribbon.

According to various embodiments, a method of managing pulling force applied to a glass sheet in a draw apparatus includes applying a front-side drive torque to a front side of the glass sheet and applying a rear-side drive torque to the glass sheet with a rear-side stub roller that contacts a rear side of the glass sheet opposite the front-side stub roller. The method also includes receiving with at least one electronic controller a front-side instantaneous pulling force signal indicative of a torque applied by the front-side stub roller to the glass sheet and receiving a rear-side instantaneous pulling force signal indicative of a torque applied by a rear-side stub roller to the glass sheet. The method further includes calculating automatically with the at least one electronic controller a front-side average pulling force applied to the glass sheet and corresponding to a first time period of at least one rotation of the front-side stub roller, and calculating automatically with the at least one electronic controller a rear-side average pulling force applied to the glass sheet and corresponding to a second time period of at least one rotation of the rear-side stub roller. The method also includes comparing the front-side average pulling force to the rear-side average pulling force to establish a pulling force differential between the front-side average pulling force and the rear-side average pulling force, and modifying one or more of the front-side drive torque or the rear-side drive torque to set the desired pulling force differential between the front-side average pulling force and the rear-side average pulling force.

According to other embodiments, a glass manufacturing apparatus for producing glass sheets includes a draw apparatus for receiving a glass sheet and drawing the glass sheet, wherein the draw apparatus includes a plurality of stub roller pairs. Each stub roller pair includes a front-side stub roller coupled to a front-side motor and positioned proximate to an edge of the glass sheet and a rear-side stub roller coupled to a rear-side motor and positioned proximate to the edge of the glass sheet such that the front-side stub roller and the rear-side stub roller are positioned along opposite sides of the glass sheet and the front-side stub roller and the rear-side stub roller contact the glass sheet. The draw apparatus also includes an electronic controller communicatively coupled to the front-side motor and the rear-side motor of each of the stub roller pairs. The electronic controller executes computer readable instructions to calculate a front-side instantaneous pulling force applied the glass sheet by the front-side stub roller based on a signal indicative of a torque applied by the front-side stub roller to the glass sheet, calculate a rear-side instantaneous pulling force applied to the glass sheet by the rear-side stub roller based on a signal indicative of a torque applied to the rear-side stub roller to the glass sheet, calculate a front-side average pulling force of the glass sheet corresponding to a first time period of at least one rotation of the front-side stub roller, and calculate a rear-side average pulling force of the glass sheet corresponding to a second time period of at least one rotation of the rear-side stub roller. The computer readable instructions also compare the front-side average pulling force to the rear-side average pulling force to establish a pulling force differential between the front-side average pulling force and the rear-side average pulling force, and modify at least one of a front-side stub roller diameter variable associated with the front-side stub roller or a rear-side stub roller diameter variable associated with the rear-side stub roller to manage draw tension applied to the glass sheet by the front-side stub roller and the rear-side stub roller.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
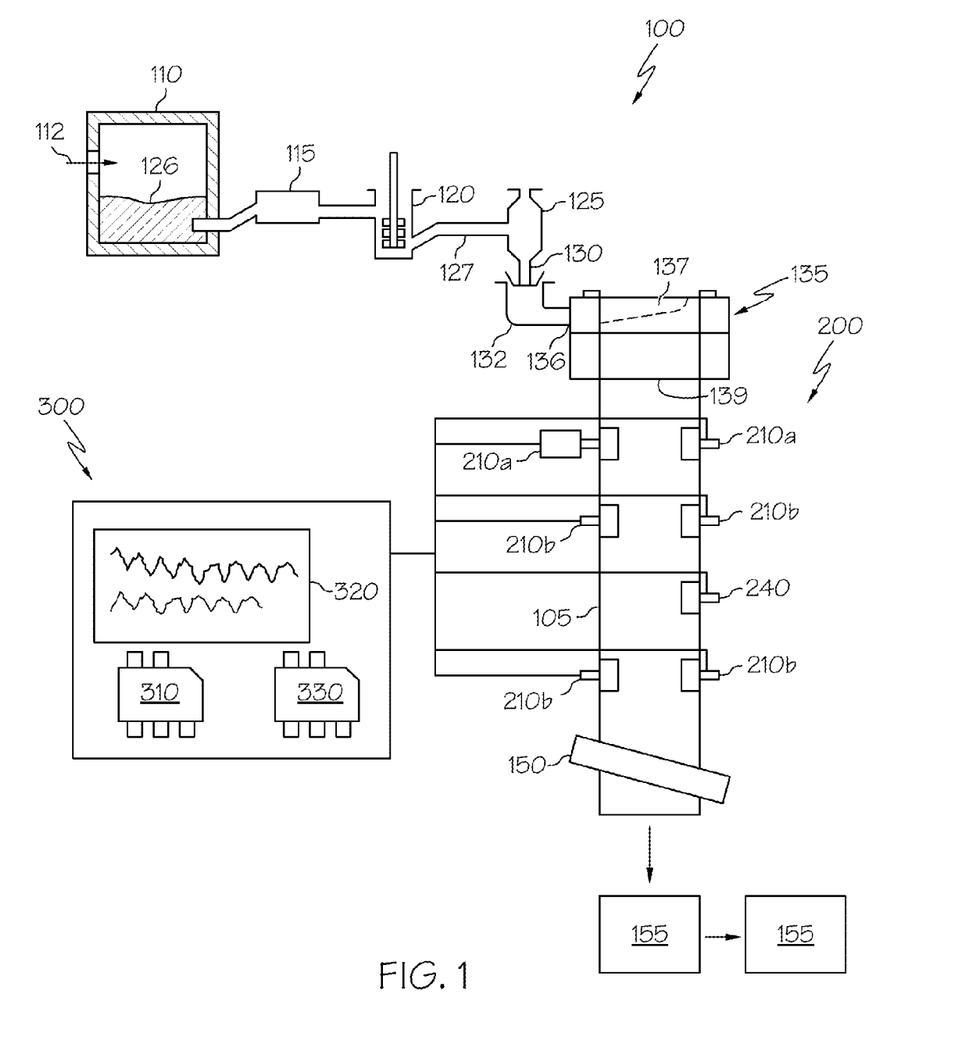
FIG. 1 schematically depicts a glass manufacturing apparatus according to one or more embodiments shown or described herein.

Reference will now be made in detail to embodiments of glass manufacturing apparatuses having draw apparatuses and methods of managing pulling forces applied to glass sheets by draw apparatuses. Whenever possible, the same reference numerals will be used throughout the drawings to refer to the same or like parts. FIG. 1 generally depicts a glass manufacturing apparatus used in the production of glass. The glass manufacturing apparatus processes batch materials into molten glass, which is introduced to a forming apparatus from which the molten glass flows to form a glass sheet. The glass sheet is contacted by a plurality of stub roller pairs positioned proximate to the edges of the glass sheet. The stub roller pairs contact the glass sheet and apply force to the glass sheet to control parameters, such as the thickness, of the solidified glass sheet. The torque applied to the glass sheet by stub roller pairs may vary based on a variety of factors including, for example and without limitation, stub roller alignment, stub roller diameter, stub roller contact pressure with the glass sheet, stub roller out-of-roundness, and transmission variation.

Control variables associated with each of the stub rollers in the stub roller pair may be modified such that a differential in force applied by corresponding stub rollers in each stub roller pair is minimized to improve performance of the glass manufacturing apparatus. Reduction in the differential in force applied by the stub rollers in each stub roller pair may reduce the total force applied to the glass ribbon, thereby reducing the likelihood of the glass ribbon slipping between the stub roller pair. Further, reduction in the differential in force applied by the stub rollers in each stub roller pair may allow for the reduction in "pinch" force applied by the stub rollers in a direction normal to the direction of travel of the glass ribbon, thereby reducing the wear of the stub rollers themselves. The glass manufacturing apparatuses having draw apparatuses and methods of managing pulling forces applied to glass sheets by draw apparatuses will be described in further detail herein with specific reference to the appended drawings.

Referring now to FIG. 1, an exemplary glass manufacturing apparatus 100 that incorporates a fusion process to produce a glass ribbon 105 is depicted. The glass manufacturing apparatus 100 includes a melting vessel 110, a fining vessel 115, a mixing vessel 120 (for example, a stir chamber 120), a delivery vessel 125 (for example, a bowl 125), a forming apparatus 135, a draw apparatus 200, and a cutting apparatus 150 (for example, a traveling anvil machine (TAM) 150). The glass manufacturing apparatus 100 produces a continuous glass ribbon 105 from batch materials, first by melting and combining the batch materials into molten glass, distributing the molten glass into a preliminary shape, applying tension to the glass ribbon 105 to control the dimensions of the glass ribbon 105 as the glass cools and viscosity increases, and cutting discrete glass sheets 155 from the glass ribbon 105 after the glass has gone through a visco-elastic transition and has mechanical properties that that give the glass sheets 155 stable dimensional characteristics.

In operation, batch materials for forming glass are introduced into the melting vessel 110 as indicated by arrow 112 and are melted to form molten glass 126. The molten glass 126 flows into the fining vessel 115, which is maintained at a temperature above that of the melting vessel 110. From the fining vessel 115, the molten glass 126 flows into a mixing vessel 120, where the molten glass 126 undergoes a mixing process to homogenize the molten glass 126. The molten glass 126 flows from the mixing vessel 120 to the delivery vessel 125, which delivers the molten glass 126 through a downcomer 130 to an inlet 132 and into the forming apparatus 135.

The forming apparatus 135 depicted in FIG. 1 is used in a fusion draw process to produce glass ribbon 105 that has high surface quality and low variation in thickness. The forming apparatus 135 includes an opening 136 that receives the molten glass 126. The molten glass 126 flows into a trough 137 and then overflows and runs down the sides of the trough 137 in two partial ribbon portions 106a, 106b (see FIG. 2) before fusing together below the root 139 of the forming apparatus 135. The two partial ribbon portions 106a, 106b of the still-molten glass 136 rejoin with one another (e.g., fuse) at locations below the root 139 of the forming apparatus 135, thereby forming a glass ribbon 105 (also referred to as a glass web). The glass ribbon 105 is drawn downward from the forming apparatus by the draw apparatus 200. While the forming apparatus 135 is shown and described herein implements a fusion draw process, it should be understood that other forming apparatuses may be used including, without limitation, slot draw apparatuses and the like.

As shown in FIG. 1 and as will be described in greater detail below, the draw apparatus 200 includes a plurality of actively-driven stub roller pairs 210a, 210b, each of which include a front-side stub roller 220 and a rear-side stub roller 230. The front-side stub roller 220 is coupled to a front-side transmission 222, which is coupled to a front-side motor 224. The front-side transmission 222 modifies the output speed and torque of the front-side motor 224 that is delivered to the front-side stub roller 220. Similarly, the rear-side stub roller 230 is coupled to a rear-side transmission 232, which is coupled to a rear-side motor 234. The rear-side transmission 232 modifies the output speed and torque of the rear-side motor 234 that is delivered to the rear-side stub roller 230.

Operation of the plurality of stub roller pairs 210 is controlled for a variety of conditions including, for example and without limitation, torque applied to the glass ribbon 105 and rate of rotation of the stub rollers 220, 230. The draw forces applied to the glass ribbon 105 by the plurality of stub roller pairs 210 while the glass ribbon 105 is still in a visco-elastic state cause the glass ribbon 105 to pull or stretch, thereby controlling the dimensions of the glass ribbon 105 by controlling the tension applied to the glass ribbon 105 as the glass ribbon 105 translates along the draw apparatus 200.

As the glass ribbon 105 is drawn through the draw apparatus 200, the glass has an opportunity to cool. Glass manufacturing apparatuses 100 having a plurality of stub roller pairs 210 may improve the control and consistency of the cross-draw tension and/or down-drawn tension in the area in which the glass ribbon 105 goes through a visco-elastic transformation. This area is defined as the "setting zone" in which the stress and flatness are set into the glass ribbon 105. Glass manufacturing apparatuses 100 that include a plurality of actively driven stub roller pairs 210 may provide improvements in the manufacturing of glass sheets 155 as compared to conventionally designed manufacturing apparatuses that incorporate rollers that extend along the entire width of the glass ribbon 105 (not shown).

After the glass ribbon 105 undergoes the visco-elastic transformation, the glass ribbon 105 may be segmented into glass sheets 155 having discrete lengths. The glass ribbon 105 may be cut into glass sheets 155 by a variety of methods and apparatuses including, for example, using a score-and-break method as implemented by the TAM 150 or a laser trim method (not shown). In the embodiment depicted in FIG. 1, the TAM 150 is a used to score the glass ribbon 105, thereby enabling discrete glass sheets 155 to be cut from the glass ribbon 105 as glass ribbon 105 is continuously produced by the glass manufacturing apparatus 100. In general, the TAM 150 used to form a horizontal score line on the moving glass ribbon 105. To accommodate translation of the glass ribbon 105 along the draw apparatus 200, the TAM 150 simultaneously travels in the same direction as the glass ribbon 105 at the same speed as the glass ribbon 105 and in a direction across the direction of travel of the glass ribbon 105. As the TAM 150 moves in the down-draw direction with the glass ribbon 105, a scoring wheel makes contact with and scores the glass ribbon 105, creating a horizontal score line across the glass ribbon. Restated, by moving at the same speed as the glass ribbon 105 in the down-draw direction, the TAM 150 is able to apply a score line to the glass ribbon 105 that is perpendicular to the down-draw direction of the glass ribbon 105. The score line enables clean separation of discrete glass sheets 155 from the continuous glass ribbon 105 using conventional bending techniques.

Glass manufacturing apparatuses 100 having a plurality of stub roller pairs 210 accommodate variations in instantaneous force variability due to a variety of factors including, for example and without limitation, glass sheet weight, down-draw tension applied by the stub roller pairs, and trimming of the glass ribbon 105 by a variety of methods including scoring of the glass sheet 105 by the TAM 150 or scoring the glass ribbon 105 with a laser (not shown). Such glass manufacturing apparatuses 100 manage cross-draw and down-draw tension, improve stability of operation of the draw apparatus 200 during the drawing operation, and minimize friction between the glass ribbon 105 and the stub roller pairs 210 to improve stability of the glass ribbon 105 resulting in flatter and/or thinner glass sheets 105 than available with conventional manufacturing apparatuses and methods.

Operation of the draw apparatus 200 will be discussed referring to FIG. 1. The operation of the stub roller pairs 210a, 210b of the draw apparatus 200 may be varied to apply the desired forces to the glass ribbon 105 during the draw operation. In one embodiment, the upper stub roller pairs 210a may operate in a constant torque mode, such that the upper stub roller pairs 210a continuously apply a pulling force to the glass ribbon 105, while varying the speed at which the glass ribbon 105 translates away from the forming apparatus 135. Controlling the speed at which the upper stub roller pairs 210a draw the glass ribbon 105 away from the forming apparatus 135 may assist with thickness control of the glass ribbon 105. The lower stub roller pairs 210b may operate in a constant speed mode, such that the lower stub roller pairs 210b continuously draw the glass ribbon 105 at a constant speed, while the torque applied to the glass ribbon 105 is free to vary. As such the lower stub roller pairs 210b maintain tension on the glass ribbon 105 while the glass ribbon 105 is in a visco-elastic state.

In some operating conditions, the lower stub roller pairs 210b may vary the direction in which the pulling force is applied to the glass ribbon 105. For example, when the glass ribbon 105 is relatively short, such as when the glass ribbon 105 has been recently trimmed, the lower stub roller pairs 210b may operate at a constant speed with a torque that applies a pulling force in the direction of travel of the glass ribbon 105. As the glass ribbon 105 continues to be pulled by the draw apparatus 200, the weight of the glass ribbon 105 increases, thereby reducing the draw force required to be applied to the glass ribbon 105 to maintain the desired thickness of the glass ribbon 105. In some embodiments, the lower stub roller pairs 210b may reverse the direction of application of the torque as the glass ribbon 105 increases in length such that the pulling force applied to the glass ribbon 105 is applied in a direction opposite the direction of travel of the glass ribbon 105. As the glass ribbon 105 is trimmed to length as to partition glass sheets 155 from the glass ribbon 105, the weight of the glass ribbon 105 is reduced. To maintain consistent pulling force on the glass ribbon 105, the magnitude and the direction of the pulling force applied by the lower stub roller pairs 210b is reversed to the direction of travel. In other embodiments, the lower stub roller pairs 210b may vary the magnitude of the pulling force applied to the glass ribbon 105, but not reverse direction.

Figure 2:
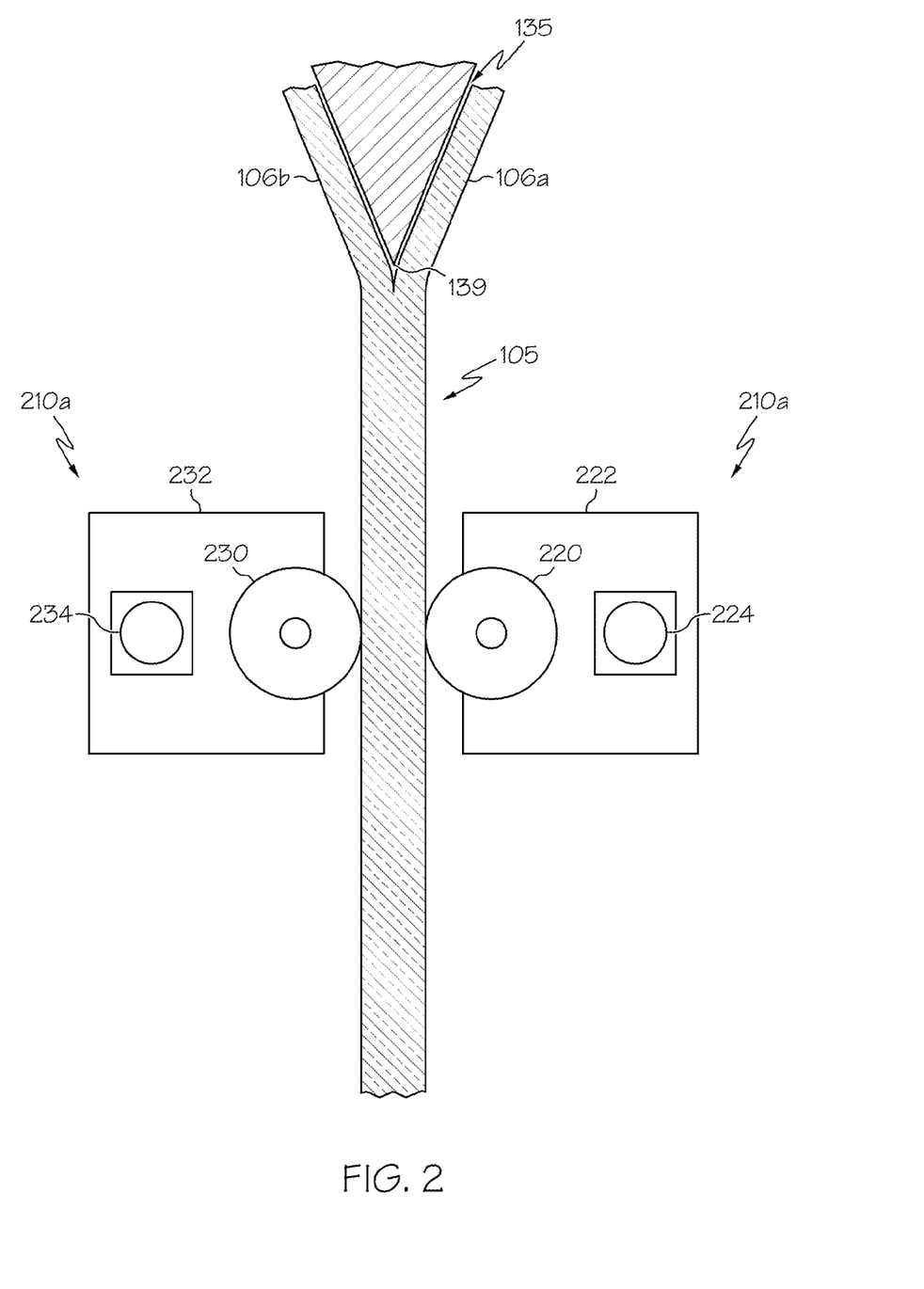
FIG. 2 schematically depicts a side view of a stub roller pair of a draw apparatus according to one or more embodiments shown or described herein.

Referring now to FIGS. 1 and 2, the front-side motor 224 and the rear-side motor 234 of each of the stub roller pairs 210 is communicatively coupled to at least one electronic controller 300 which controls operation of the front-side motor 224 and the rear-side motor 234. The electronic controller 300 may vary the speed and/or torque delivered by each of the front-side motors 224 and rear-side motors 234 in each of the plurality of stub roller pairs 210 to provide the desired tension to the glass ribbon 105. As the glass ribbon 105 as it travels along the draw apparatus 200, the glass ribbon 105 transitions towards greater elasticity. At the glass ribbon 105 approaches the end of the draw apparatus 200, the TAM 150 scores the glass ribbon 105 at a given sheet length such that the glass ribbon 105 may be separated into discrete pieces of glass sheet 155.

Glass manufacturing apparatuses 100 that include a plurality of stub roller pairs 210 may be prone to variations in the draw tension applied to the glass ribbon 105 during the draw process. Such variations may be attributed to a variety of factors including, for example and without limitation, variation in speed between upper stub roller pairs 210a and lower stub roller pairs 210b, variation in pulling force applied between front-side stub rollers 220 and rear-side stub rollers 230 in a stub roller pair 210, and mismatch in speed between the TAM 150 and the draw apparatus 200. Accordingly, glass manufacturing apparatuses 100 according to the present disclosure include the at least one electronic controller 300, as discussed hereinabove, which includes computer readable instructions stored in a memory 330 and executed by a processor 310 that determine the draw tension applied to the glass ribbon 105 by each of the front-side stub rollers 220 and the rear-side stub rollers 230 in each stub roller pair 210. Further, the computer readable instructions allow modification of parameters, for example, stub roller diameter variables, to account for changes in the outer diameters of the front-side stub rollers 220 and the rear-side stub rollers 230 caused, for example, by stub roller wear.

Glass manufacturing apparatuses 100 according to the present disclosure that include the elements discussed herein exhibit improved performance as compared to conventional designs. Such performance improvements may be exhibited by a reduction in inclusions in glass sheets 105, reduction in roll slippage between the stub roller pairs 210 and the glass ribbon 105, thereby further reducing wear of the stub rollers 220, 230, reduction in the wear rate of the stub rollers 220, 230 caused by misalignment between the stub rollers 220, 230, and reduction of defects and/or glass breakage caused by stub rollers 220, 230 generating scratches and/or flaws on the surfaces of the glass sheets 105. Further, glass manufacturing apparatuses 100 according to the present disclosure may improve the accuracy of measurement of the feed rate of the glass sheets 105 as they are trimmed from the draw apparatus 200. An increase in the accuracy of the feed rate may increase the accuracy of the score performed by the TAM 150 or a laser (not shown). Increase in the accuracy of the score produced by the TAM 150 improves the yield of glass sheets 150 produced by the glass manufacturing apparatus 100 by reducing trim scrap and may reduce the need for subsequent cutting operations.

In one embodiment, the front-side motor 224 and the rear-side motor 234 may be selected from a variety of appropriate motors including, for example and without limitation, AC synchronous motors, brushless DC motors, brushed DC motors, AC servomotors, DC servomotors, and the like. Torque output by the motors 224, 234 to the stub rollers 220, 230 may be measured. In one embodiment, a plurality of sensors, for example strain gages, may sense the amount of torque applied by the motors 224, 234. In another embodiment, the torque generated by the motors 224, 234 may be calculated based on the current delivered to the motors 224, 234 when rotating the transmissions 222, 232 and the stub rollers 220, 230, respectively. Evaluating the torque output of the motors 224, 234 by monitoring the current used by the motors 224, 234 provides data of the torque applied to the glass ribbon 105 at a high sampling rate, such that small variations in the torque applied to the glass ribbon 105 can be measured.

The torque output of the motors 224, 234 is sent as a signal to the electronic controller 300 where the signals are processed by at least one processor 310 to calculate the front-side instantaneous drive torque, and therefore, the front-side instantaneous pulling force, applied by the front-side stub roller 220 and the rear-side instantaneous drive torque, and therefore, the rear-side instantaneous pulling force applied by the rear-side stub roller 230. In one embodiment, the front-side instantaneous pulling force may be algebraically calculated by multiplying the front-side instantaneous drive torque applied to the front-side stub roller 220 by the diameter of the front-side stub roller 220. Similarly, the rear-side instantaneous pulling force may be algebraically calculated by multiplying the rear-side instantaneous drive torque applied to the rear-side stub roller 230 by the diameter of the rear-side stub roller 230. Further, an intrinsic linear feed rate of the glass ribbon 105 passing through the draw apparatus 200 may be calculated by the electronic controller 300 by multiplying the diameter of the front-side and/or rear-side stub roller 220, 230 by the front-side drive speed of the front-side stub roller 220 or the drive-side drive speed of the rear-side stub roller 230.

Calculation of the front-side and rear-side instantaneous pulling force may be complicated, however, by wear of the front-side and rear-side stub rollers 220, 230. As the stub rollers 220, 230 are used in the draw apparatus 200 to process glass sheets 105, the diameters of the stub rollers 220, 230 themselves are reduced due to wear. Measurement of the diameter of the stub rollers 220, 230 themselves is difficult and not practical in a production environment. Accordingly, in some embodiments, the electronic controller 300 includes a stub roller wear compensation algorithm to account for variations in the stub roller 220, 230 diameters, as will be discussed in further detail below.

Figure 3:
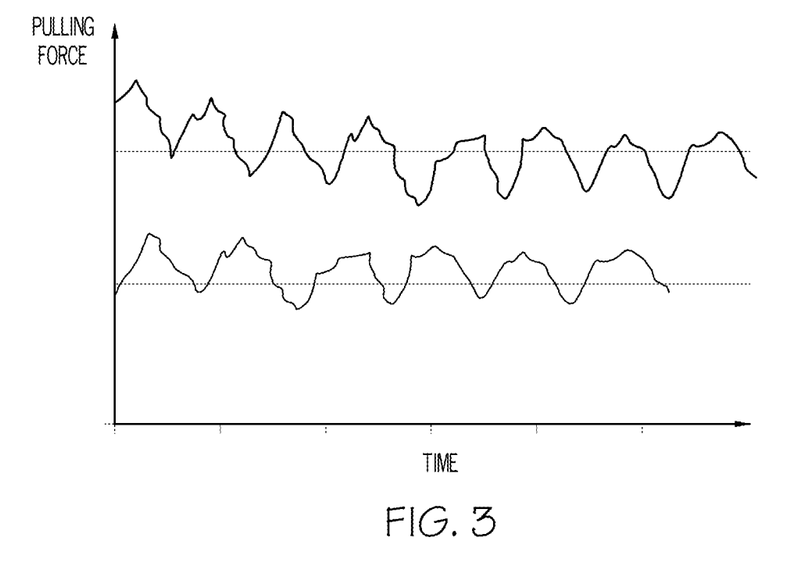
FIG. 3 schematically depicts a hypothetical data plot measuring instantaneous and average pulling force applied by two stub rollers in a stub roller pair according to one or more embodiments shown or described herein.

Referring now to FIG. 3, a hypothetical data plot depicting the front-side instantaneous pulling force and the rear-side instantaneous pulling force of a stub roller pair 210 is depicted. Such a data plot may be graphically displayed to a user of the glass manufacturing apparatus 100 on a display monitor 320 communicatively coupled to the electronic controller 300, as depicted in FIG. 1. Referring again to FIG. 3, the instantaneous pulling force plots exhibit variations in the pulling force applied to the glass ribbon 105 at a high frequency. As used herein, high frequency variations in the pulling force refer to variations that occur at time periods less than about one rotation of a stub roller pair 210, while low frequency variations in the pulling force refer to variations that occur at time periods greater than about one rotation of a stub roller pair 210. The high frequency variations in pulling force may be attributed to a variety of factors including, for example and without limitation, out-of-roundness of the stub rollers 220, 230, non-concentricity of the stub rollers 220, 230, variations in alignment of the stub rollers 220, 230, variations in the transmissions 222, 232 of the stub roller pair 210, and slippage of the glass ribbon 105 by the stub rollers 220, 230. To mask the high frequency variations of the pulling force, the data may be sampled over a longer time period. The electronic controller 300 processes the front-side instantaneous pulling force and the rear-side instantaneous pulling force to calculate a front-side average pulling force and a rear-side average pulling force, respectively.

In some embodiments, a front-side average pulling force is calculated by the electronic controller by determining a moving average of the front-side instantaneous pulling force for a time period corresponding to at least one rotation of the front-side stub roller. Similarly, a rear-side average pulling force is calculated by the electronic controller by determining a moving average of the rear-side instantaneous pulling force for a time period corresponding to at least one rotation of the rear-side stub roller. As depicted in FIG. 3, the front-side average pulling force and the rear-side average pulling force are depicted relative to the front-side instantaneous pulling force and the rear-side instantaneous pulling force, respectively. The front-side average pulling force and the rear-side average pulling force may be calculated by the electronic controller at a predetermined time period, such as, for example, at a time period corresponding to three rotations of the front-side stub roller and the rear-side stub roller, respectively.

The difference between the front-side average pulling force and the rear-side average pulling force indicates a pulling force differential between the average pulling force applied by the front-side stub roller and the rear-side stub roller in a stub roller pair. To adjust the pulling force, the positions of the front-side stub roller and/or the rear-side stub roller in the stub roller pair may be adjusted to modify the contact between the stub rollers and the glass ribbon. Alternatively or in addition, the torque applied by the motors to the stub rollers may be modified such that the pulling force applied by each of the stub rollers in the stub roller pair may more closely match. By reducing the pulling force differential between the front-side average pulling force applied by the front-side stub roller and the rear-side average pulling force applied by the rear-side stub roller, improvements in the finish characteristics of the glass ribbon may be realized.

Referring again to FIG. 1, in embodiments of the draw apparatus 200 according to the present disclosure, the wear compensation algorithm included in the computer readable instructions executed by the processor 310 of the electronic controller 300 includes a front-side stub roller diameter variable that corresponds to the diameter of the front-side stub roller 220 and a rear-side stub roller diameter variable that corresponds to the diameter of the rear-side stub roller 230. As discussed hereinabove, the electronic controller 300 may calculate the pulling force applied to the glass ribbon 105 by the front-side stub rollers 220 and/or the rear-side stub rollers 230, as well as the intrinsic linear feed rate of the glass ribbon 105 as the glass ribbon 105 translates along the draw apparatus 200. When stub rollers 220, 230 are initially installed in the draw apparatus 200, the front-side stub-roller diameter variables and the rear-side stub-roller diameter variables may be set to match the actual diameters of the corresponding stub rollers 220, 230. Therefore, calculation of pulling force applied by the stub rollers and intrinsic linear feed rate of the glass ribbon 105 is accurately calculated by the electronic controller 300.

The electronic controller 300 may implement the wear compensation algorithm such that the front-side stub roller diameter variables and/or the rear-side stub roller diameter variables that correspond to the diameters of the stub rollers 220, 230 in each of the stub roller pairs 210 may be modified to account for the change in diameter of the stub rollers 220, 230 cause by wear. In one embodiment, the front-side stub roller diameter variable or the rear-side stub roller diameter variable may be modified such that the calculation of pulling force applied by the front-side stub rollers 220 and the rear-side stub rollers 230 is modified. In association with the modification of the front-side stub roller diameter variable or the rear-side stub roller diameter variable, the relative balance of torque applied by the motors 224, 234 coupled to the stub rollers 220, 230 may be modified by the electronic controller 300.

In the hypothetical example depicted in FIG. 3, the front-side stub roller applies an average pulling force to the glass ribbon that is greater than the average pulling force that rear-side stub roller applies to the glass ribbon, with the same drive torque applied to the stub rollers due to the variation in diameters of the front-side stub roller and the rear-side stub roller. As such, the translation of drive torque applied to the stub rollers and the pulling force applied to the glass ribbon is not equal between the front-side stub roller and the rear-side stub roller. The difference in the average pulling force given equal application of drive torque indicates that there may be a discrepancy in the diameters of the stub rollers. To compensate for the discrepancy in the diameter of the stub rollers, the rear-side stub roller diameter variable may be decreased in the electronic controller. In some embodiments, an operator of the draw apparatus may manually adjust the front-side and/or rear-side stub roller diameter variables and verify proper adjustment by viewing the front-side and rear-side average pulling force on a display 320 communicatively coupled to the processor 310 of the electronic controller 300 (see FIG. 1). By reducing the rear-side stub roller diameter variable, the calculation of rear-stub roller instantaneous pulling force will be reduced. To compensate for the decrease in the calculated rear-stub roller instantaneous pulling force, the rear-side motor will increase the torque delivered to the rear-side stub roller. With the increase in torque applied to the rear-side stub roller, the pulling force differential calculated by the electronic controller between the front-side average pull force and the rear-side average pull force may be reduced. The rear-side stub roller diameter variable may be further reduced until the pulling force differential between the front-side average pull force and the rear-side average pull force is reduced to a desired level.

Figure 4:
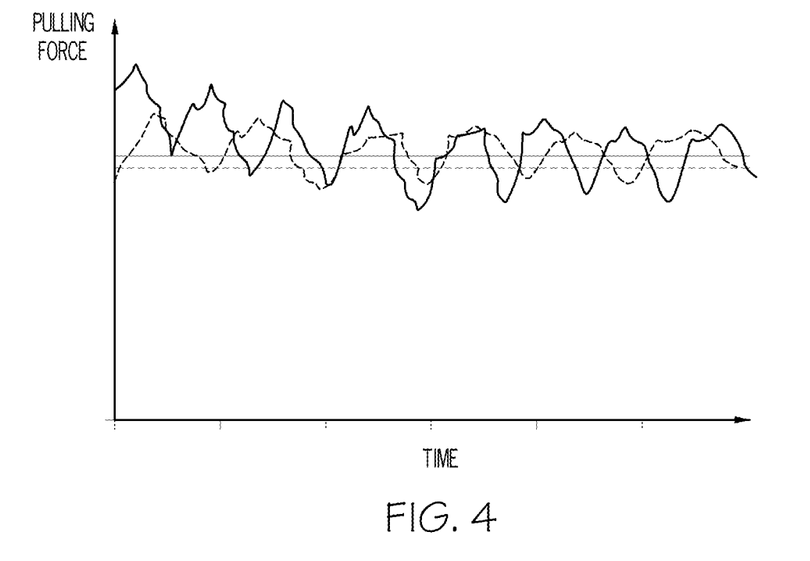
FIG. 4 schematically depicts a hypothetical data plot measuring instantaneous and average pulling force applied by two stub rollers in a stub roller pair according to one or more embodiments shown or described herein.

Referring now to FIG. 4, a hypothetical data plot depicting the front-side instantaneous pulling force, the rear-side instantaneous pulling force, the front-side average pulling force, and the rear-side average pulling force for one stub roller pair is illustrated. The data plot depicted in FIG. 4 has had the wear compensation algorithm implemented, as discussed hereinabove, to manage stub roller wear and pulling force applied to the glass sheet. The implementation of the wear compensation algorithm decreases the pulling force differential between the front-side stub roller and the rear-side stub roller. Further, the wear compensation algorithm may reduce the absolute pulling forces applied by at least one of the front-side or rear-side stub rollers during the draw process. A reduction in the pulling forces applied by the stub rollers may reduce the likelihood of slippage of the stub rollers on the glass sheet, thereby reducing the rate of formation of inclusions in the glass sheet.

Referring again to FIG. 1, the wear compensation algorithm executed by the electronic controller 300 may, alternatively or in addition, include an extrinsic linear feed rate of the glass ribbon 105 to determine wear of the stub rollers 220, 230. As used herein, the term "extrinsic" refers to a measurement that occurs outside of the stub roller pairs 210 of the draw apparatus 200 that apply force to the glass ribbon 105 to translate the glass ribbon 105 through the draw apparatus 200. In one embodiment, the glass ribbon 105 is measured after being cut to a length by the TAM 150. The length of the glass ribbon 105 may be input to the electronic controller 300, which calculates the extrinsic linear feed rate of the glass ribbon 105. In another embodiment, the draw apparatus 200 may include at least one slave stub roller 240 positioned to contact the glass ribbon 105 as the glass ribbon 105 traverses through the draw apparatus 200. The at least one slave stub roller 240 is communicatively coupled to the electronic controller 300 such that the at least one slave stub roller 240 indicates its rate of rotation. The rate of rotation of the at least one slave stub roller 240 and the diameter of the at least one slave stub roller 240 may be used to determine the extrinsic linear feed rate of the glass ribbon 105 as the glass ribbon 105 translates along the draw apparatus 200. The extrinsic linear feed rate of the glass ribbon 105 measured by any of the extrinsic measurement devices may be received by the electronic controller 300. The electronic controller 300 may modify the front-side stub roller diameter variable and/or the rear-side stub roller diameter variable of any of the stub roller pairs 210, such that the intrinsic linear feed rate measured by the front-side stub rollers 220 and/or the rear-side stub rollers 230 more closely matches the extrinsic linear feed rate.

Alternatively or in addition, forces generated by the TAM 150 as the TAM 150 cuts the glass ribbon 105 to length may be used to verify accuracy of the intrinsic linear feed rate of the glass ribbon 105 as the glass ribbon 105 translates along the draw apparatus 200. The TAM 150 is configured to apply a score line across the glass ribbon 105 that is normal to the edges of the glass ribbon 105. However, because the glass ribbon 105 continues to be drawn along the draw apparatus 200 during the scoring operation, the TAM 150 is configured translate with the glass ribbon 150 in the down-draw direction while simultaneously translating across the glass ribbon 105 in the cross-draw direction. By scoring the glass ribbon 105 in such a manner, the TAM 150 translates in the down-draw direction and the cross-draw direction to facilitate scoring the glass ribbon 105 approximately perpendicular to the edges of the glass ribbon 105 and to the down-draw direction of the glass ribbon 105.

The relative speeds at which the TAM 150 translates in the down-draw direction and the cross-draw direction are set by the linear feed rate of the glass ribbon 105. In some embodiments, the linear feed rate of the glass ribbon 105 is provided by the electronic controller 300, which relies on the intrinsic linear feed rate determined by the front-side stub rollers 220 and/or the rear-side stub rollers 230. If the intrinsic linear feed rate of the glass ribbon 105 does not match the actual linear feed rate of the glass ribbon 105, there will be relative motion between the TAM 150 and the glass ribbon 105 in the down-draw direction such that the score line applied by the TAM 150 is not normal to the edges of the glass ribbon 105. This relative motion of the TAM with respect to the glass ribbon 105 along the down-draw direction may be sensed by the front-side motor 224 and the rear-side motor 234 coupled to the front-side stub roller 220 and the rear-side stub roller 230, respectively, as the torque output by the motors 224, 234 may change during operation of the TAM 150. As such, a change in application of torque by the motors 224, 234 during operation of the TAM 150, particularly those motors operating in a constant velocity mode, may be indicative of a discrepancy between the intrinsic linear feed rate of the glass ribbon 105 as determined by the front-side stub rollers 220 and/or the rear-side stub rollers 230, and the actual linear feed rate of the glass ribbon 105. For example, a downward application of force by the TAM 150 indicates that actual linear feed rate of the glass ribbon 105 is slower than the intrinsic linear feed rate as determined by the front-side stub rollers 220 and/or the rear-side stub rollers 230.

It should now be understood that glass manufacturing apparatuses having draw apparatuses according to the present disclosure utilize electronic controllers that receive feedback from the stub rollers in the stub roller pairs. The electronic controllers smooth the data received from the stub rollers to reduce noise in the data to provide a more accurate comparison between data received from the stub rollers. The electronic controllers may include wear compensation algorithms that allow for parameters related to the stub rollers to be modified and thereby to more evenly apply pulling force to the glass sheet as the glass sheet is translated along the draw apparatus. The wear compensation algorithms also improve the accuracy of measurement of the linear feed rate of the glass sheet. Improvements in the pulling forces and accuracy of measurement of linear feed rate increase yields from the glass manufacturing apparatus and reduce formation of inclusions in the glass sheet itself It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

In a first aspect, the disclosure provides a method of managing pulling force applied to a glass ribbon in a draw apparatus, the method comprising: applying a front-side pulling force to a front side of the glass ribbon with a front-side stub roller; applying a rear-side pulling force to the glass ribbon with a rear-side stub roller that contacts a rear side of the glass ribbon opposite the front-side stub roller; receiving with at least one electronic controller a front-side instantaneous drive torque signal indicative of a front-side drive torque applied by the front-side stub roller to the glass ribbon; receiving a rear-side instantaneous drive torque signal indicative of a rear-side drive torque applied by the rear-side stub roller to the glass ribbon; calculating automatically with the at least one electronic controller a front-side average pulling force applied to the glass ribbon and corresponding to a first time period of at least one rotation of the front-side stub roller; calculating automatically with the at least one electronic controller a rear-side average pulling force applied to the glass ribbon and corresponding to a second time period of at least one rotation of the rear-side stub roller; comparing the front-side average pulling force to the rear-side average pulling force to establish a pulling force differential between the front-side average pulling force and the rear-side average pulling force; and modifying one or more of the front-side pulling force or the rear-side pulling force to adjust the pulling force differential between the front-side average pulling force and the rear-side average pulling force.

In a second aspect, the disclosure provides a glass manufacturing apparatus for producing glass ribbon comprising: a draw apparatus for receiving a glass ribbon and drawing the glass ribbon, wherein the draw apparatus includes a plurality of stub roller pairs, each stub roller pair including: a front-side stub roller coupled to a front-side motor and positioned proximate to an edge of the glass ribbon; and a rear-side stub roller coupled to a rear-side motor and positioned proximate to the edge of the glass ribbon such that the front-side stub roller and the rear-side stub roller are positioned along opposite sides of the glass ribbon and the front-side stub roller and the rear-side stub roller contact the glass ribbon; and at least one electronic controller communicatively coupled to the front-side motor and the rear-side motor of each of the stub roller pairs, the electronic controller comprising a processor and a memory for storing computer readable instructions that, when the computer readable instruction set is executed by the processor, the at least one electronic controller: calculates a front-side average pulling force of the glass ribbon corresponding to a first time period of at least one rotation of the front-side stub roller; calculates a rear-side average pulling force of the glass ribbon corresponding to a second time period of at least one rotation of the rear-side stub roller; and compares the front-side average pulling force to the rear-side average pulling force to establish a pulling force differential between the front-side average pulling force and the rear-side average pulling force.

In a third aspect, the disclosure provides the method of managing pulling force of the first aspect, further comprising graphically displaying the front-side average pulling force and the rear-side average pulling force.

In a fourth aspect, the disclosure provides the method of managing pulling force of the first and third aspects, wherein the front-side average pulling force applied to the glass ribbon is calculated based on a front-side stub roller diameter variable and the front-side instantaneous drive torque signal, the front-side stub roller diameter variable being indicative of the actual diameter of the front-side stub roller.

In a fifth aspect, the disclosure provides the method of managing pulling force of the first and third through fourth aspects, further comprising modifying the front-side stub roller diameter variable to adjust a front-side drive speed of the front-side stub roller.

In a sixth aspect, the disclosure provides the method of managing pulling force of the first and third through fifth aspects, wherein the rear-side instantaneous pulling force of the glass ribbon is calculated based on a rear-side stub roller diameter variable and the rear-side instantaneous drive torque signal, the rear-side stub roller diameter variable being indicative of the actual diameter of the rear-side sub roller.

In a seventh aspect, the disclosure provides the method of managing pulling force of the first and third through sixth aspects, further comprising modifying the rear-side stub roller diameter variable to adjust a rear-side drive speed of the rear-side stub roller.

In an eighth aspect, the disclosure provides the method of managing pulling force of the first and third through seventh aspects, wherein: the front-side instantaneous drive torque signal is calculated automatically by the at least one electronic controller based on an electrical current directed to a front-side motor coupled to the front-side stub roller; and the rear-side instantaneous drive torque signal is calculated automatically by the at least one electronic controller based on an electrical current directed to a rear-side motor coupled to the rear-side stub roller.

In a ninth aspect, the disclosure provides the method of managing pulling force of the first and third through eighth aspects, further comprising modifying at least one of a front-side drive speed of the front-side stub roller or a rear-side drive speed of the rear-side stub roller to control a thickness of the glass ribbon.

In a tenth aspect, the disclosure provides the method of managing pulling force of the first and third through ninth aspects, further comprising calculating with the at least one automatic controller an intrinsic linear feed rate of the glass ribbon based on at least one of: a front-side drive speed of the front-side stub roller and a front-side stub roller diameter variable; or a rear-side drive speed of the rear-side stub roller and a rear-side stub roller diameter variable.

In an eleventh aspect, the disclosure provides the method of managing pulling force of the tenth aspect, further comprising: receiving with the at least one electronic controller an extrinsic linear feed rate of the glass ribbon; and comparing the intrinsic linear feed rate of the glass ribbon to the extrinsic linear feed rate of the glass ribbon.

In a twelfth aspect, the disclosure provides the method of managing pulling force of the eleventh aspect, further comprising cutting the glass ribbon, wherein the extrinsic linear feed rate of the glass ribbon is calculated with the at least one electronic controller based on a length of a glass sheet cut from the glass ribbon.

In a thirteenth aspect, the disclosure provides the method of managing pulling force of the eleventh aspect, wherein the extrinsic linear feed rate is calculated with the at least one electronic controller based on a rate of rotation of at least one slave stub roller positioned to contact the glass ribbon as the glass ribbon translates in the draw apparatus.

In a fourteenth aspect, the disclosure provides the method of managing pulling force of the first and third through thirteenth aspect, further comprising: scoring the glass ribbon with a score wheel that is synchronized to traverse the glass ribbon moving at an intrinsic linear feed rate; and determining with the at least one controller whether scoring the glass ribbon with the score wheel applies force in a down-draw direction to the glass ribbon, wherein force applied to the glass ribbon by the score wheel in the down-draw direction indicates discrepancy in the intrinsic linear feed rate from the actual linear feed rate of the glass ribbon.

In a fifteenth aspect, the disclosure provides the glass manufacturing apparatus of the second aspect, further comprising: a melting vessel for melting batch materials and forming molten glass; and a forming apparatus for receiving the molten glass and forming the glass ribbon.

In a sixteenth aspect, the disclosure provides the glass manufacturing apparatus of the second and fifteenth aspects, wherein the forming apparatus forms the glass ribbon in a fusion draw process.

In a seventeenth aspect, the disclosure provides the glass manufacturing apparatus of the second and fifteenth through sixteenth aspects, wherein the stub roller pairs of the draw apparatus further comprise a front-side transmission coupling the front-side stub roller to the front-side motor and a rear-side transmission coupling the rear-side stub roller to the rear-side motor.

In an eighteenth aspect, the disclosure provides the glass manufacturing apparatus of the second and fifteenth through seventeenth aspects, wherein the draw apparatus further comprises a graphical user interface for monitoring and modifying system control parameters of the at least one electronic controller.

In a nineteenth aspect, the disclosure provides the glass manufacturing apparatus of the second and fifteenth through eighteenth aspects, further comprising a traveling anvil machine for cutting a glass sheet from the glass ribbon.

In a twentieth aspect, the disclosure provides the glass manufacturing apparatus of the second and fifteenth through nineteenth aspects, further comprising at least one slave stub roller positioned to contact the glass ribbon as the glass ribbon translates along the draw apparatus and communicatively coupled to the electronic controller.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of managing pulling force applied to a glass ribbon in a draw apparatus, the method comprising:
    applying a front-side pulling force to a front side of the glass ribbon with a front-side stub roller;
    applying a rear-side pulling force to the glass ribbon with a rear-side stub roller that contacts a rear side of the glass ribbon opposite the front-side stub roller;
    receiving with at least one electronic controller a front-side instantaneous drive torque signal indicative of a front-side drive torque applied by the front-side stub roller to the glass ribbon, wherein the front-side instantaneous drive torque signal is based on an electrical current directed to a front-side motor coupled to the front-side stub roller;
    receiving with the at least one electronic controller a rear-side instantaneous drive torque signal indicative of a rear-side drive torque applied by the rear-side stub roller to the glass ribbon wherein the rear-side instantaneous drive torque signal is based on an electrical current directed to a rear-side motor coupled to the rear-side stub roller;
    calculating automatically with the at least one electronic controller a front-side average pulling force applied to the glass ribbon and corresponding to a first time period of at least one rotation of the front-side stub roller;
    calculating automatically with the at least one electronic controller a rear-side average pulling force applied to the glass ribbon and corresponding to a second time period of at least one rotation of the rear-side stub roller;
    comparing the front-side average pulling force to the rear-side average pulling force to establish a pulling force differential between the front-side average pulling force and the rear-side average pulling force; and modifying one or more of the front-side pulling force or the rear-side pulling force to adjust the pulling force differential between the front-side average pulling force and the rear-side average pulling force.

2. The method of claim 1, further comprising graphically displaying the front-side average pulling force and the rear-side average pulling force.

3. The method of claim 1, wherein the front-side average pulling force applied to the glass ribbon is calculated based on a front-side stub roller diameter variable and the front-side instantaneous drive torque signal, the front-side stub roller diameter variable being indicative of the actual diameter of the front-side stub roller.

4. The method of claim 3, further comprising modifying the front-side stub roller diameter variable to adjust a front-side drive speed of the front-side stub roller.

5. The method of claim 1, wherein the rear-side instantaneous pulling force of the glass ribbon is calculated based on a rear-side stub roller diameter variable and the rear-side instantaneous drive torque signal, the rear-side stub roller diameter variable being indicative of the actual diameter of the rear-side sub roller.

6. The method of claim 5, further comprising modifying the rear-side stub roller diameter variable to adjust a rear-side drive speed of the rear-side stub roller.

7. The method of claim 1, further comprising modifying at least one of a front-side drive speed of the front-side stub roller or a rear-side drive speed of the rear-side stub roller to control a thickness of the glass ribbon.

8. The method of claim 1, further comprising calculating with the at least one automatic controller an intrinsic linear feed rate of the glass ribbon based on at least one of:

a front-side drive speed of the front-side stub roller and a front-side stub roller diameter variable; or a rear-side drive speed of the rear-side stub roller and a rear-side stub roller diameter variable.

9. The method of claim 8, further comprising:

receiving with the at least one electronic controller an extrinsic linear feed rate of the glass ribbon; and comparing the intrinsic linear feed rate of the glass ribbon to the extrinsic linear feed rate of the glass ribbon.

10. The method of claim 9, further comprising cutting the glass ribbon, wherein the extrinsic linear feed rate of the glass ribbon is calculated with the at least one electronic controller based on a length of a glass sheet cut from the glass ribbon.

11. The method of claim 9, wherein the extrinsic linear feed rate is calculated with the at least one electronic controller based on a rate of rotation of at least one slave stub roller positioned to contact the glass ribbon as the glass ribbon translates in the draw apparatus.

12. The method of claim 1, further comprising:

scoring the glass ribbon with a score wheel that is synchronized to traverse the glass ribbon moving at an intrinsic linear feed rate; and determining with the at least one controller whether scoring the glass ribbon with the score wheel applies force in a down-draw direction to the glass ribbon, wherein force applied to the glass ribbon by the score wheel in the down-draw direction indicates discrepancy in the intrinsic linear feed rate from the actual linear feed rate of the glass ribbon.

* * * * *